United States Patent
Gurunathan et al.

(10) Patent No.: US 8,263,276 B1
(45) Date of Patent: Sep. 11, 2012

(54) STARTUP POWER CONTROL IN A FUEL CELL SYSTEM

(75) Inventors: Ranganathan Gurunathan, Chennai (IN); Srinivasan Vijay Sarathy, Chennai (IN); Ramesh Srinivasan, Chennai (IN)

(73) Assignee: Bloom Energy Corporation, Sunnyvale, CA (US)

( * ) Notice: Subject to any disclaimer, the term of this patent is extended or adjusted under 35 U.S.C. 154(b) by 622 days.

(21) Appl. No.: 12/458,173

(22) Filed: Jul. 2, 2009

Related U.S. Application Data

(60) Provisional application No. 61/129,622, filed on Jul. 8, 2008.

(51) Int. Cl.
  *H01M 14/00* (2006.01)
  *H02J 3/28* (2006.01)

(52) U.S. Cl. ............. 429/429; 307/18; 307/23; 307/24; 307/25; 307/64; 307/66; 700/286; 429/430

(58) Field of Classification Search .................. 307/10.1, 307/10.6, 11, 18, 19, 21, 25, 64, 23, 24, 66, 307/149, 150; 429/429–432, 50, 90; 700/286
See application file for complete search history.

(56) References Cited

U.S. PATENT DOCUMENTS

| | | | | |
|---|---|---|---|---|
| 2,999,971 | A * | 9/1961 | Schnecke | 363/141 |
| 6,320,732 | B1 * | 11/2001 | Norman et al. | 361/62 |
| 6,396,391 | B1 * | 5/2002 | Binder | 340/538.15 |
| 6,452,289 | B1 * | 9/2002 | Lansberry et al. | 307/25 |
| 6,902,837 | B2 * | 6/2005 | McCluskey et al. | 429/9 |
| 7,087,327 | B2 * | 8/2006 | Pearson | 429/431 |
| 7,274,975 | B2 * | 9/2007 | Miller | 700/295 |
| 7,545,053 | B2 * | 6/2009 | Yoshikawa et al. | 307/19 |
| 7,705,490 | B2 | 4/2010 | Srinivasan | |
| 7,781,912 | B2 | 8/2010 | McKenzie | |
| 7,839,020 | B2 * | 11/2010 | Nakanishi | 307/65 |
| 7,974,106 | B2 * | 7/2011 | Gurunathan et al. | 363/17 |
| 2008/0067869 | A1 * | 3/2008 | Evans et al. | 307/11 |
| 2009/0273240 | A1 | 11/2009 | Gurunathan et al. | |

* cited by examiner

*Primary Examiner* — Joseph Drodge
(74) *Attorney, Agent, or Firm* — The Marbury Law Group PLLC

(57) ABSTRACT

A method for starting up a fuel cell arrangement includes receiving a first electrical signal from an alternative power source. At least a portion of the first electrical signal is provided to a balance of plant (BOP) load, where the BOP load is in electrical communication with a fuel cell system. It is determined whether a startup threshold of the fuel cell system is met. If the startup threshold is met, a second electrical signal is provided from the fuel cell system to the BOP load, where a combination of the first electrical signal and the second electrical signal corresponds to a load demand of the BOP load. A value of the second electrical signal is increased and a value of the first electrical signal is decreased until the load demand of the BOP load is met by the fuel cell system.

24 Claims, 3 Drawing Sheets

STARTUP POWER CONTROL IN A FUEL CELL SYSTEM

CROSS REFERENCE TO RELATED APPLICATIONS

The present application claims priority to U.S. Provisional Patent Application No. 61/129,622, filed on Jul. 8, 2008, the entire disclosure of which is incorporated herein by reference.

FIELD

The subject of the disclosure relates generally to startup power control and distribution in a fuel cell system. More specifically, the disclosure relates to a system and method for using an external power source to provide initial startup power and seamlessly transitioning to internal fuel cell system power after the initial startup.

BACKGROUND

Fuel cell systems can be used to provide electrical power to external loads such as buildings, appliances, lights, tools, air conditioners, heating units, factory equipment and machinery, power storage units, computers, security systems, electric grids, etc. In addition to providing power to external loads, the electricity produced by a fuel cell system can also be used internally by the fuel cell system. For example, the electricity produced by the fuel cell system can be used to control fuel cell system variables such as temperature, fuel flow rate, pressure, etc. by controlling output power of the system and/or by powering balance of plant (BOP) components such as blowers, etc. Electricity produced by the fuel cell system can also be used to power auxiliary devices, control units, monitoring devices, etc. utilized by the fuel cell system. Traditional fuel cell systems also utilize substantial electrical power during fuel cell system startup. During startup, the electrical power is used to power BOP loads and components.

SUMMARY

An exemplary method for starting up a fuel cell arrangement is provided. The method includes receiving a first electrical signal from an alternative power source. At least a portion of the first electrical signal is provided to a balance of plant (BOP) load, where the BOP load is in electrical communication with a fuel cell system. It is determined whether a startup threshold of the fuel cell system is met. If the startup threshold is met, a second electrical signal is provided from the fuel cell system to the BOP load, where a combination of the first electrical signal and the second electrical signal corresponds to a load demand of the BOP load. A value of the second electrical signal is increased and a value of the first electrical signal is decreased until the load demand of the BOP load is met by the fuel cell system.

An exemplary system for starting up a fuel cell arrangement is provided. The system includes a fuel cell system, a rectifier, and a controller. The rectifier is configured to receive a first electrical signal from an alternative power source, where the first electrical signal is an alternating current (AC) signal. The rectifier is also configured to convert the first electrical signal into a direct current (DC) signal, and provide the DC signal to a balance of plant (BOP) load, where the BOP load is in electrical communication with the fuel cell system. The controller is configured to determine whether a startup threshold of the fuel cell system is met. If the startup threshold is met, the controller is configured to provide a second electrical signal from the fuel cell system to the BOP load, where a combination of the DC signal and the second electrical signal corresponds to a load demand of the BOP load. The controller is further configured to increase a value of the second electrical signal and reduce a value of the first electrical signal until the load demand of the BOP load is met by the fuel cell system.

Another exemplary system for starting up a fuel cell arrangement is provided. The system includes means for receiving a first electrical signal from an alternative power source and for providing at least a portion of the first electrical signal to a balance of plant (BOP) load, where the BOP load is in electrical communication with a fuel cell system. The system also includes means for providing a second electrical signal from the fuel cell system to the BOP load if a startup threshold of the fuel cell system is met, where a combination of the first electrical signal and the second electrical signal corresponds to a load demand of the BOP load. The system further includes means for increasing a value of the second electrical signal and reducing a value of the first electrical signal until the load demand of the BOP load is met by the fuel cell system.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

In a traditional fuel cell arrangement, approximately 10-20% of fuel cell system capacity is utilized during startup to power various balance of plant (BOP) devices, startup devices, etc. As a result, the inventors have perceived that traditional fuel cell arrangements are limited in their ability to rapidly startup and provide power to internal and/or external loads during startup. To improve fuel cell system performance and efficiency during startup, the inventors have perceived a need for a fuel cell arrangement in which startup power is received from an alternative power source. The inventors have also perceived a need for a fuel cell arrangement in which a seamless transition is made from the alternative power source to internal fuel cell system power after the initial startup.

Figure 1:
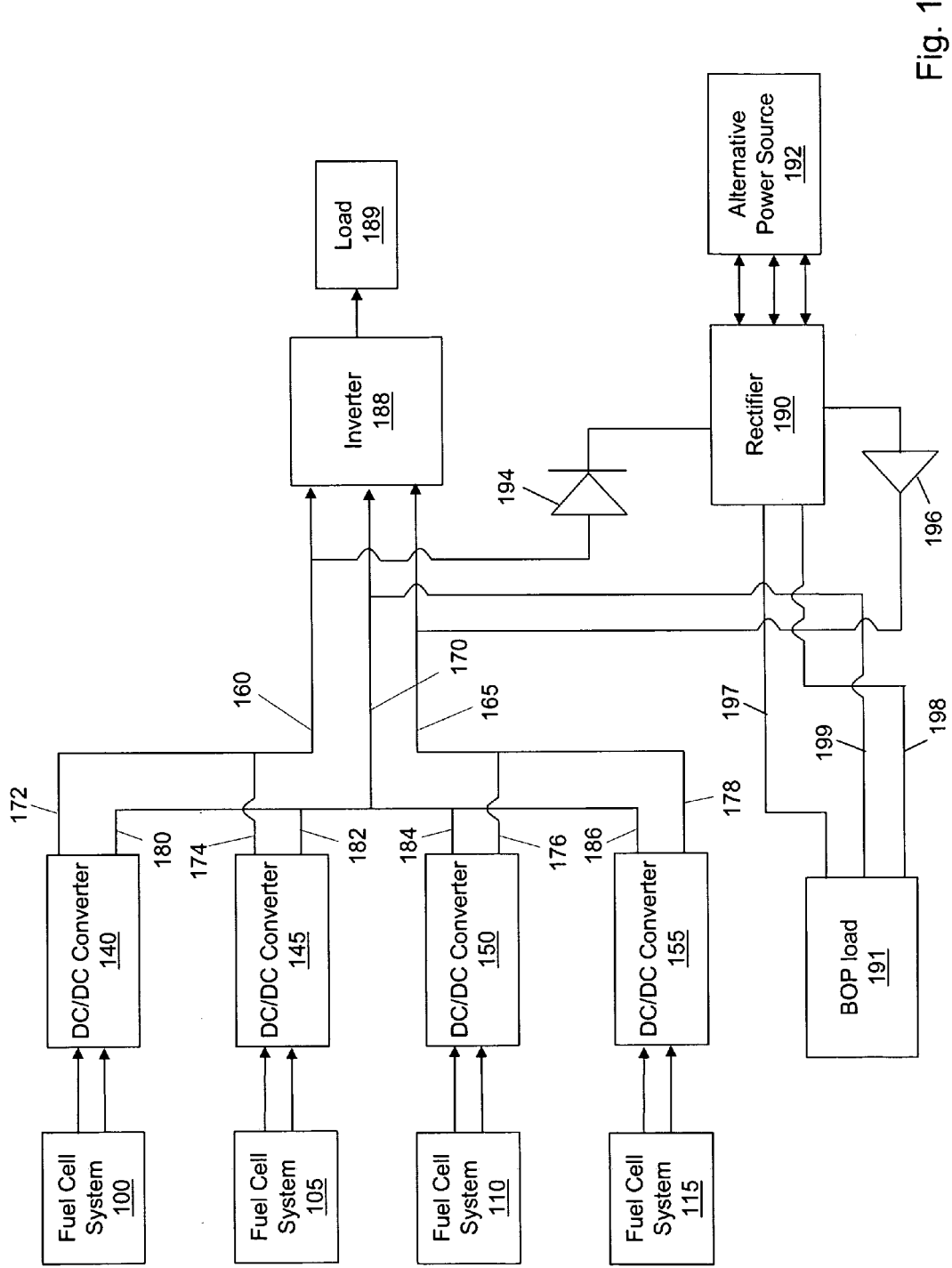
FIG. 1 is a block diagram illustrating a fuel cell arrangement with startup power control in accordance with an exemplary embodiment.

FIG. 1 is a block diagram illustrating a fuel cell arrangement with startup power control in accordance with an exemplary embodiment. The fuel cell arrangement includes a first fuel cell system 100, a second fuel cell system 105, a third fuel cell system 110, and a fourth fuel cell system 115. Fuel cell systems 100, 105, 110, and 115 can produce a direct current (DC) signal as known to those of skill in the art. In alternative embodiments, fewer or additional fuel cell systems can be included in the system. In an exemplary embodiment, a fuel cell system can include one or more fuel cell columns, each of which may contain one or more fuel cell stacks, such as solid oxide fuel cell stacks. A fuel cell stack can refer to a plurality of individual fuel cells which are electrically connected in series. Alternatively, a fuel cell system can refer to a single fuel cell stack. The number of individual fuel cells which make up a given fuel cell system can depend on the amount of electrical power which the given fuel cell system is intended to generate.

In alternative embodiments, fuel cell systems 100, 105, 110, and 115 can include any other configuration, arrangement, and/or number of individual fuel cells, and may be arranged in a modular configuration, where the power supply system is comprised of separate fuel cell modules or systems, associated power conditioning modules, and fuel pre-processing modules. An exemplary fuel cell system is described in U.S. patent application Ser. No. 11/797,707 (filed May 7, 2007 and entitled Ripple Cancellation), the disclosure of which is incorporated herein by reference in its entirety.

The fuel cell arrangement also includes a DC/DC converter 140, a DC/DC converter 145, a DC/DC converter 150, and a DC/DC converter 155. Fuel cell system 100 is in electrical communication with DC/DC converter 140, fuel cell system 105 is in electrical communication with DC/DC converter 145, fuel cell system 110 is in electrical communication with DC/DC converter 150, and fuel cell system 115 is in electrical communication with DC/DC converter 155. As used herein, electrical communication can refer to any direct or indirect electrical connection. The DC/DC converters can be used to increase (i.e., boost) the voltage of the DC signals received from the fuel cell systems. For example, DC/DC converter 140 can be used to increase the voltage of the DC signal received from fuel cell system 100, DC/DC converter 145 can be used to increase the voltage of the DC signal received from fuel cell system 105, and so on. In an alternative embodiment, DC/DC converters 140, 145, 150, and 155 may be used to decrease the voltage of the DC signals produced by fuel cell systems 100, 105, 110, and 115. In another alternative embodiment, DC/DC converters may not be used.

As illustrated in FIG. 1, positive and negative outputs of the DC/DC converters 140, 145, 150, and 155 are combined to form a spit bus. The split bus includes a positive bus 160, a negative bus 165, and a neutral bus 170. Positive bus 160 is formed with a positive output 172 from DC/DC converter 140 and a positive output 174 from DC/DC converter 145. Negative bus 165 is formed with a negative output 176 from DC/DC converter 150 and a negative output 178 from DC/DC converter 155. Neutral bus 170 is formed with a negative output 180 from DC/DC converter 140, a negative output 182 from DC/DC converter 145, a positive output 184 from DC/DC converter 150, and a positive output 186 from DC/DC converter 155 (such that the positive and negative outputs combine to form a neutral output for neutral bus 170). In alternative embodiments, the split bus may be formed by any other combinations of the outputs of DC/DC converters 140, 145, 150, and 155. In one embodiment, the split bus configuration described in U.S. application Ser. No. 11/797,707, filed on May 7, 2007 and incorporated herein by reference in its entirety may be used. In another alternative embodiment, a split bus configuration may not be used.

The fuel cell arrangement also includes an inverter 188 which receives the DC signal from the split bus. Inverter 188 can be any electrical device configured to receive a direct current and convert the received direct current into an alternating current for provision to a load 189. In alternative embodiments, any number of internal and/or external loads may be provided with an AC signal from inverter 188. The AC signal from inverter 188 to the loads can be a three-phase AC signal. Alternatively, any other AC signal may be used. In an exemplary embodiment, load 189 can be an electrical grid to which electrical power is provided from the fuel cell arrangement. The electrical grid may also provide electrical power to the fuel cell arrangement. Alternatively, load 189 can be a building, an appliance, an air conditioner, a heating unit, a computer, a security system, etc. In one embodiment, inverter 188 may not be used and load 189 may be a DC load.

The fuel cell arrangement also includes a BOP load 191. Balance of plant load 191 can be an auxiliary device used during startup, a control unit used during startup, a monitoring device used during startup, a balance of plant device such as a blower, etc., and/or any other load. BOP load 191 may need to be supplied power before power from fuel cell systems 100, 105, 110, and 115 can be processed. As such, an external source of power may be used. In an exemplary embodiment, power for BOP load 191 can be provided from alternative power source 192 during startup. Alternative power source 192 can be an electrical grid, a solar cell system, a wind turbine system, a hydroelectric system, a generator, a battery, an additional fuel cell system, etc. As illustrated with reference to FIG. 3, alternative power source 192 may also be the same as load 189. In one embodiment, an uninterruptible power supply (not shown) may be also used in the event that alternative power source 192 is unable to provide power during startup.

Alternative power source 192 can provide an alternating current (AC) signal to a rectifier 190. Rectifier 190 can be any electrical device configured to receive an alternating current and convert the received alternating current into a direct current. As illustrated in FIG. 1, the AC signal provided from alternative power source 192 to rectifier 190 can be a three phase AC signal. Alternatively, the AC signal may be a single phase AC signal or any other type of AC signal. In another alternative embodiment, alternative power source 192 may provide a DC signal, and rectifier 190 may not be used.

Rectifier 190 can provide a DC signal to BOP load 191 through a BOP bus having a positive bus 197, a negative bus 198, and a neutral bus 199. Neutral bus 199 is in electrical communication with neutral bus 170 of the split bus. A diode 194 is in electrical communication with rectifier 190 and positive bus 160 of the split bus. In an exemplary embodiment, diode 194 can also be in electrical communication with positive bus 197 of the BOP bus. As such, diode 194 can be used to allow positive bus 197 to receive a positive DC signal from positive bus 160. Diode 194 can also be used to prevent positive bus 160 from receiving a positive DC signal from positive bus 197 or from rectifier 190. Similarly, a diode 196 is in electrical communication with rectifier 190 and negative bus 165 of the split bus. In an exemplary embodiment, diode 196 can also be in electrical communication with negative bus 198 of the BOP bus. As such, diode 196 can be used to allow negative bus 198 of the BOP bus to receive a negative DC signal from negative bus 165 of the split bus. Diode 196 can also be used to prevent negative bus 165 of the split bus from receiving a negative DC signal from negative bus 198 of the BOP bus or from rectifier 190.

In an exemplary embodiment, each of DC/DC converter 140, DC/DC converter 145, DC/DC converter 150, and DC/DC converter 155 can have a controller (not shown). Alternatively, a single controller can be used to control all of DC/DC converters 140, 145, 150, and 155. The one or more controllers can be proportional-integral (PI) controllers, proportional-integral-derivative (PID) controllers, proportional-derivative (PD) controllers, proportional (P) controllers, integral (I) controllers, or any other type of controller(s) known to those of skill in the art. The one or more controllers can be configured to provide a control signal to DC/DC converters 140, 145, 150, and 155 based on any of a plurality of factors, including load demand and operating characteristics of fuel cell systems 100, 105, 110, and 115. The operating characteristics can include a fuel flow rate, a temperature, a pressure, etc. The control signal can also be based on the current, voltage, amount of power, etc. being produced by fuel cell systems 100, 105, 110, and 115 during startup and/or the load demand of BOP load 191. In an exemplary embodiment, the one or more controllers can be used to ensure that power is not provided from the split bus to the BOP bus until a startup threshold is met by fuel cell systems 100, 105, 110, and 115. The startup threshold can be a predetermined output voltage, current, power, etc. of fuel cell systems 100, 105, 110, and 115. The startup threshold may also be a predetermined amount of time after startup of fuel cell systems 100, 105, 110, and 115. When the predetermined threshold is met, power from fuel cell systems 100, 105, 110, and 115 can begin being provided to BOP load 191.

As an example, at startup, power may not initially be provided from fuel cell systems 100, 105, 110, and 115 to BOP load 191. Instead, BOP load 191 can receive a DC signal originating from alternative power source 192. Alternative power source 192 can provide an AC signal to rectifier 190, and rectifier 190 can convert the received AC signal into the DC signal. The DC signal can be provided from rectifier 190 to BOP load 191 along positive bus 197 and negative bus 198 of the BOP bus. As described above, diode 194 and diode 196 can be used to ensure that the DC signal is not provided from rectifier 190 to the split bus. The one or more controllers can be used to determine when fuel cell systems 100, 105, 110, and 115 are ready to begin providing power to BOP load 191 (i.e., when the startup threshold is met). When the startup threshold is met, a second DC signal can be provided from the split bus (160, 165, 170) to the BOP bus (197, 198, 199) through diode 194 and diode 196.

In an exemplary embodiment, a combination of the DC signal originating from alternative power source 192 and the DC signal provided from fuel cell systems 100, 105, 110, and 115 can correspond to a load demand of BOP load 191. A controller associated with rectifier 190 may be used to ensure that the load demand of BOP load 191 is met but not exceeded. Alternatively, any other controller may be used. As the output from fuel cell systems 100, 105, 110, and 115 increases, the amount of power provided to BOP load 191 from the fuel cell systems can be increased and the amount of power provided to BOP load 191 from alternative power source 192 can be decreased. This can continue until the load demand of BOP load 191 is met entirely with power from fuel cell systems 100, 105, 110, and 115. Once fuel cell systems 100, 105, 110, and 115 are able to fully support BOP load 191, rectifier 190 can stop receiving power from alternative power source 192. As such, alternative power source 192 can be shut down. Alternatively, if alternative power source 192 is a battery or other chargeable source, power can be provided from the split bus to alternative power source 192 for charging.

In addition, an inverter controller (not shown) associated with inverter 188 can begin to draw excess power for load 189 once BOP load 191 is fully supported by fuel cell systems 100, 105, 110, and 115. In an exemplary embodiment, at full power, DC/DC converters 140, 145, 150, and 155 can provide positive bus 160 with +390 volts and negative bus 165 with −390 volts. Inverter 188 can receive an input of approximately +380 volts from positive bus 160 and approximately −380 volts from negative bus 165. The DC signal received by BOP load 191 along the BOP bus can be less than the voltage on the split bus (i.e., less than ±390 volts) and less than the voltage input to inverter 188 (i.e., less than ±380 volts). In alternative embodiments, other voltage values may be used.

Figure 2:
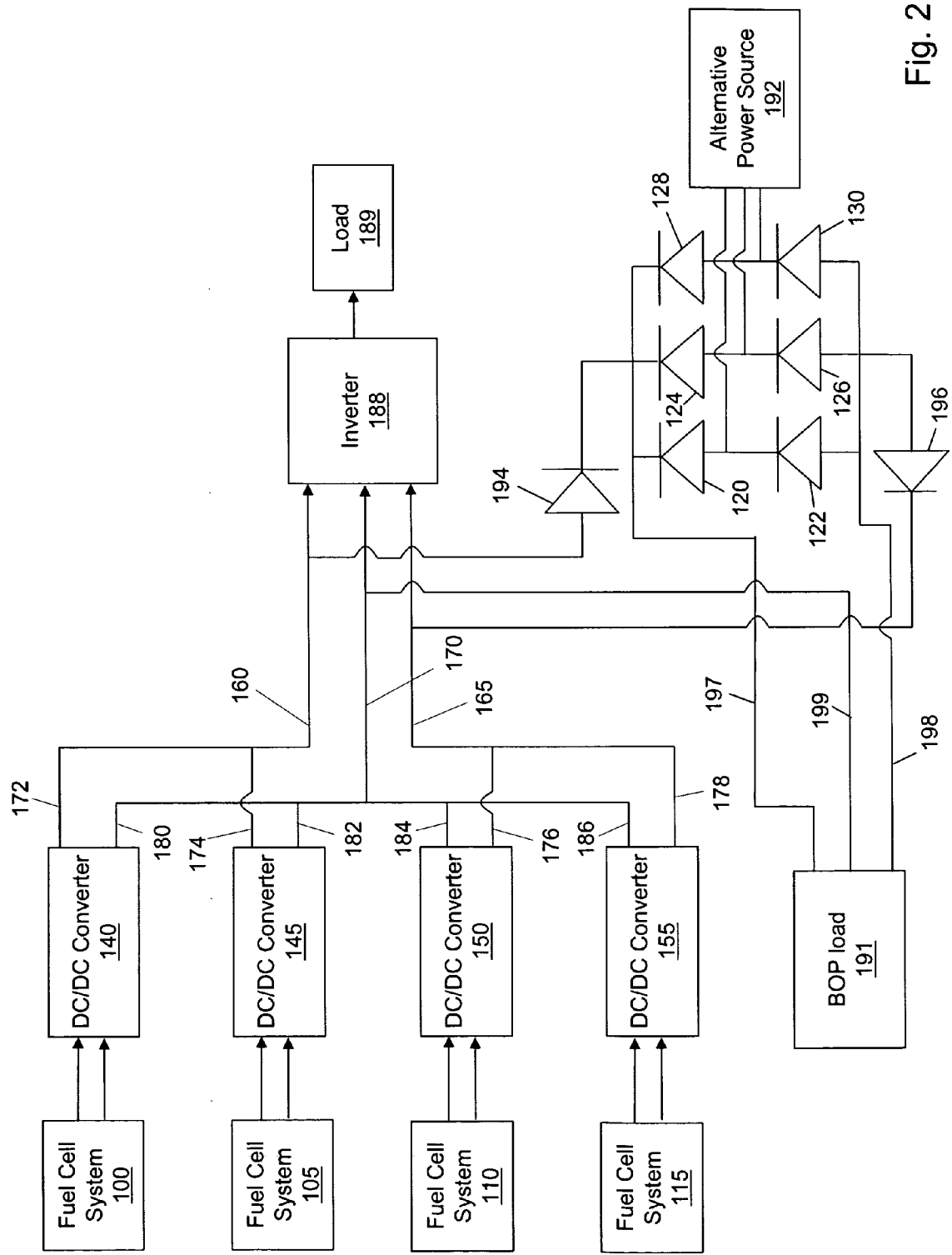
FIG. 2 is a block diagram illustrating a fuel cell arrangement with a diode rectifier in accordance with an exemplary embodiment.

An exemplary rectifier module can be implemented using diodes. An exemplary embodiment of a fuel cell arrangement with a diode rectifier is illustrated with reference to FIG. 2. In alternative embodiments, any other type of rectifier may be used. The diode rectifier includes a diode 120, a diode 122, a diode 124, a diode 126, a diode 128, and a diode 130. Diode 120 and diode 122 can be used to convert a first phase of an AC signal received from alternative power source 192 into a DC signal. A positive portion of the first phase of the AC signal can be provided to positive bus 197 of the BOP bus through diode 120, and a negative portion of the first phase of the AC signal can be provided to negative bus 198 of the BOP bus through diode 122. Diode 124 and 126 can similarly provide positive and negative portions of a second phase of the AC signal to the BOP bus, and diode 128 and diode 130 can provide positive and negative portions of a third phase of the AC signal to the BOP bus. As described above, diode 194 and diode 196 can be used to prevent provision of the positive and negative DC signals received from alternative power source 192 to the split bus.

Figure 3:
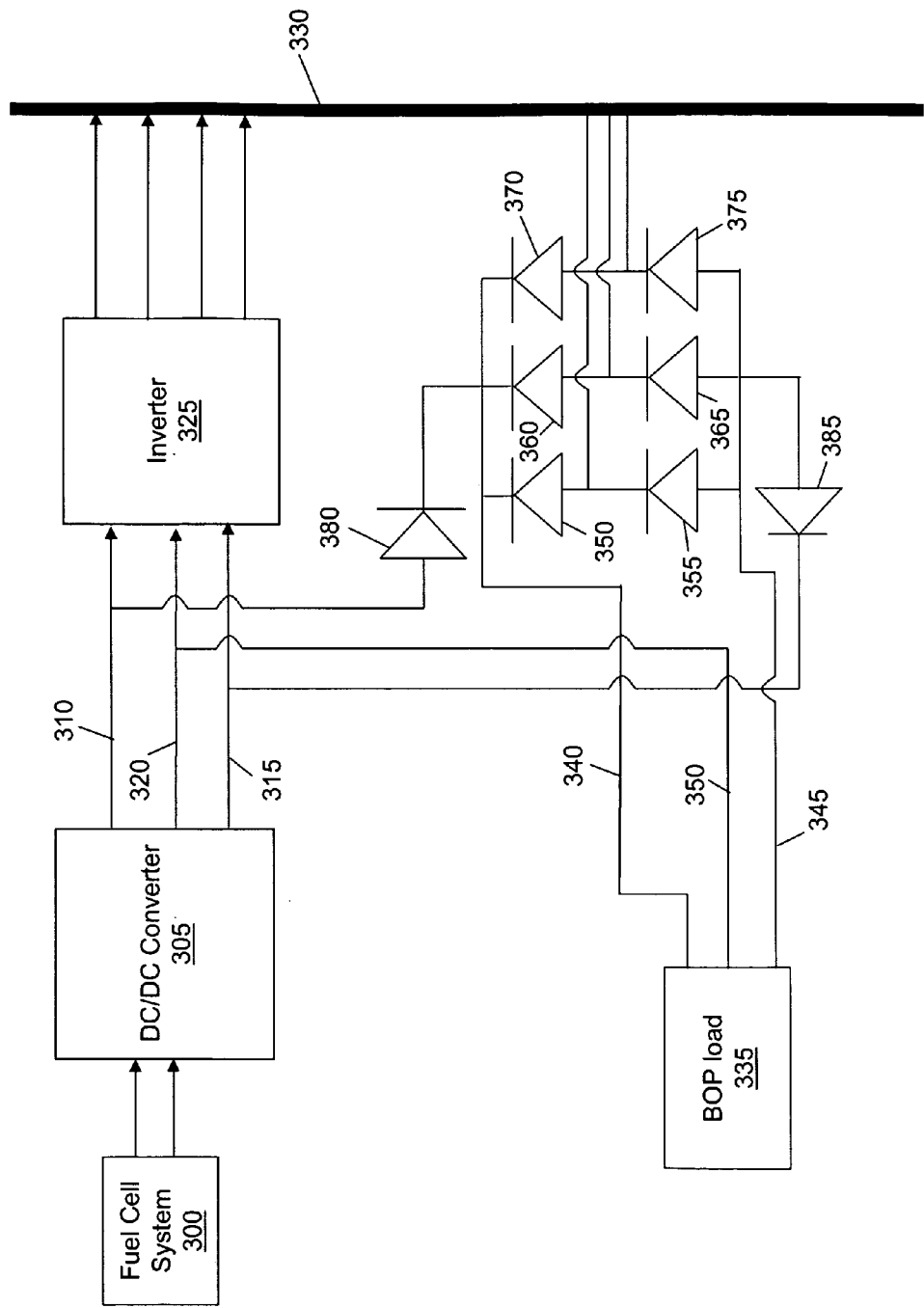
FIG. 3 is a block diagram illustrating a grid-connected fuel cell arrangement with a diode rectifier in accordance with an exemplary embodiment.

FIG. 3 is a block diagram illustrating a grid-connected fuel cell arrangement with a diode rectifier in accordance with an exemplary embodiment. A fuel cell system 300 can provide a DC signal to a DC/DC converter 305. Fuel cell system 300 can be any of fuel cell systems 100, 105, 110, or 115 described with reference to FIG. 1. Similarly, DC/DC converter 305 can be any of DC/DC converters 140, 145, 150, or 155 described with reference to FIG. 1. In an exemplary embodiment, DC/DC converter 305 can include a controller. A split bus having a positive bus 310, a negative bus 315, and a neutral bus 320 can receive a DC signal from DC/DC converter 305. An inverter 325 can receive the DC signal from the split bus and convert the DC signal into an AC signal for provision to a grid 330. Inverter 325 can be the same as inverter 188 described with reference to FIG. 1, and grid 330 can be load 189 and/or alternative power source 192 described with reference to FIG. 1. The AC signal provided to grid 330 can be three phase and can include a neutral signal. Alternatively, any other type of AC signal may be provided from inverter 325 to grid 330.

A BOP load 335 can receive DC power from a BOP bus having a positive bus 340, a negative bus 345, and a neutral bus 350. BOP load 335 can be the same as BOP load 191 described with reference to FIG. 1. Initially, during startup of fuel cell system 300, BOP load 335 can receive power from grid 330. Grid 330 can provide a three phase AC signal to a diode rectifier having a diode 350, a diode 355, a diode 360, a diode 365, a diode 370, and a diode 375. The diode rectifier can function the same as the diode rectifier described with reference to FIG. 2. A diode 380 can be used to ensure that DC power from positive bus 340 of the BOP bus is not provided to positive bus 310 of the split bus. Similarly, a diode 385 can be used to ensure that DC power from negative bus 345 of the BOP bus is not provided to negative bus 315 of the split bus.

In an exemplary embodiment, the controller associated with DC/DC converter 305 can be used to determine when a startup threshold of fuel cell system 300 is met. When it is determined that the startup threshold is met, the controller can cause DC power from the fuel cell system 300 to be provided to the BOP bus. As DC power is provided to BOP load 335 from fuel cell system 300, the diode rectifier can reduce the amount of AC power drawn from grid 330. The diode rectifier may be controlled by the controller associated with DC/DC converter 305 or by a separate controller, depending on the embodiment. The diode rectifier can be controlled by controlling the inputs received by the diodes (350-375) of the diode rectifier. When BOP load 335 becomes fully supported by DC power from fuel cell system 300, the system can stop drawing AC power from grid 330. Further, as the DC power produced by fuel cell system 300 exceeds the load demand of BOP load 335, inverter 325 can be used to provide excess power to grid 330.

Any of the components described herein can be implemented in hardware and/or software, depending on the embodiment. Further, any of the control processes and other processes described herein may be implemented as instructions stored in a computer-readable medium. When executed by a processor, the instructions can cause a computing device to implement the processes as described. Exemplary computer-readable media can include magnetic storage devices, optical disks, smart cards, flash memory devices, etc. The word "exemplary" is used herein to mean serving as an example, instance, or illustration. Any aspect or design described herein as "exemplary" is not necessarily to be construed as preferred or advantageous over other aspects or designs.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for starting up a fuel cell arrangement, the method comprising:
   receiving a first electrical signal from an alternative power source;
   providing at least a portion of the first electrical signal to a balance of plant (BOP) load, wherein the BOP load is in electrical communication with a fuel cell system;
   determining whether a startup threshold of the fuel cell system is met;
   if the startup threshold is met, providing a second electrical signal from the fuel cell system to the BOP load, wherein a combination of the first electrical signal and the second electrical signal corresponds to a load demand of the BOP load; and
   increasing a value of the second electrical signal and reducing a value of the first electrical signal until the load demand of the BOP load is met by the fuel cell system.

2. The method of claim 1, wherein the first electrical signal is an alternating current (AC) signal, and further comprising converting the AC signal into a direct current (DC) signal using a rectifier.

3. The method of claim 2, wherein the rectifier comprises a diode rectifier.

4. The method of claim 1, further comprising providing the second signal to a BOP bus in electrical communication with the BOP load from a split bus in electrical communication with the fuel cell system.

5. The method of claim 4, further comprising preventing provision of the first electrical signal from the BOP bus to the split bus.

6. The method of claim 5, wherein provision of the first electrical signal from the BOP bus to the split bus is prevented using one or more diodes.

7. The method of claim 1, wherein the alternative power source comprises one or more of an electrical grid, a solar cell system, a wind turbine system, a hydroelectric system, a generator, and a battery.

8. The method of claim 1, wherein the startup threshold is based at least in part on a voltage of the second electrical signal, a current of the second electrical signal, or a power of the second electrical signal.

9. The method of claim 1, wherein the balance of plant (BOP) load comprises at least one of a control unit of the fuel cell system, a monitoring device of the fuel cell system or a balance of plant device of the fuel cell system.

10. The method of claim 9, wherein the balance of plant (BOP) load comprises a balance of plant blower device of the fuel cell system.

11. An apparatus comprising:
    a fuel cell system;
    a rectifier configured to
       receive a first electrical signal from an alternative power source, wherein the first electrical signal is an alternating current (AC) signal;
       convert the first electrical signal into a direct current (DC) signal; and
       provide the DC signal to a balance of plant (BOP) load, wherein the BOP load is in electrical communication with the fuel cell system; and
    a controller configured to
       determine whether a startup threshold of the fuel cell system is met;
       if the startup threshold is met, provide a second electrical signal from the fuel cell system to the BOP load, wherein a combination of the DC signal and the second electrical signal corresponds to a load demand of the BOP load; and
       increase a value of the second electrical signal and reduce a value of the first electrical signal until the load demand of the BOP load is met by the fuel cell system.

12. The apparatus of claim 11, further comprising an inverter configured to:
    receive a third electrical signal from the fuel cell system, wherein the third electrical signal is a DC signal;
    convert the third electrical signal into a second AC signal; and
    provide the second AC signal to an external load.

13. The apparatus of claim 12, wherein the external load comprises an electrical grid.

14. The apparatus of claim 13, wherein the alternative power source comprises the electrical grid.

15. The apparatus of claim 11, further comprising:
    a split bus having a first positive bus, a first negative bus, and a first neutral bus, wherein the split bus is in electrical communication with the fuel cell system; and
    a BOP bus having a second positive bus, a second negative bus, and a second neutral bus, wherein the BOP bus is in electrical communication with the BOP load.

16. The apparatus of claim 15, further comprising at least one diode in electrical communication with the split bus and the BOP bus, wherein the diode is configured to prevent provision of at least a portion of the first electrical signal from the BOP bus to the split bus.

17. The apparatus of claim 11, further comprising a DC/DC converter configured to increase a voltage of the second electrical signal.

18. A system for starting up a fuel cell arrangement, the system comprising:

means for receiving a first electrical signal from an alternative power source and for providing at least a portion of the first electrical signal to a balance of plant (BOP) load, wherein the BOP load is in electrical communication with a fuel cell system;

means for providing a second electrical signal from the fuel cell system to the BOP load if a startup threshold of the fuel cell system is met, wherein a combination of the first electrical signal and the second electrical signal corresponds to a load demand of the BOP load; and means for increasing a value of the second electrical signal and for reducing a value of the first electrical signal until the load demand of the BOP load is met by the fuel cell system.

19. The system of claim 18, further comprising means for converting the first electrical signal from an alternating current (AC) signal to a direct current (DC) signal.

20. The system of claim 18, further comprising:

means for receiving a third electrical signal from the fuel cell system; and means for providing the third electrical signal to an external load.

21. The system of claim 20, wherein the external load comprises an electrical grid, and further wherein the alternative power source comprises the electrical grid.

22. The system of claim 20, wherein the means for receiving the first electrical signal and for providing at least the portion of the first electrical signal to the BOP load comprises a rectifier, wherein the means for providing the second electric signal to the BOP load comprises a split bus, wherein the means for increasing the value of the second electrical signal and for reducing the value of the first electrical signal comprises a controller, wherein the means for receiving the third electrical signal comprises a direct current/direct current converter, and further wherein the means for providing the third electrical signal to the external load comprises an inverter.

23. The system of claim 20, wherein the means for increasing the value of the second electrical signal and for reducing the value of the first electrical signal further comprises means for determining whether the startup threshold is met by the fuel cell system.

24. The system of claim 18, wherein the alternative power source comprises one or more of a solar cell system, a wind turbine system, a hydroelectric system, a generator, and a battery.

* * * * *